United States Patent [19]

Helm, Sr.

[11] Patent Number: 5,083,375
[45] Date of Patent: Jan. 28, 1992

[54] DRYWALL CUTTING DEVICE

[76] Inventor: Larry Helm, Sr., 4716 N. 36th Ave., Omaha, Nebr. 68111

[21] Appl. No.: 714,684

[22] Filed: Jun. 13, 1991

[51] Int. Cl.$^5$ ............... B26B 29/00; B26B 29/02; B43C 13/02
[52] U.S. Cl. ........................... 30/294; 30/293; 30/42
[58] Field of Search ............... 30/280, 289, 290, 293, 30/294; 33/42, 41.1

[56] References Cited

U.S. PATENT DOCUMENTS

| | | | |
|---|---|---|---|
| 2,282,729 | 5/1942 | Knauf | 30/293 |
| 2,818,644 | 1/1958 | Crawford | 30/293 |
| 2,952,025 | 9/1960 | Johnson | |
| 3,174,225 | 3/1965 | Abraham | 30/293 |
| 4,255,856 | 2/1965 | Mackie | |
| 4,394,800 | 7/1983 | Griset | 33/42 |
| 4,967,482 | 11/1990 | Hoover et al. | 33/42 |
| 4,977,673 | 12/1990 | Altizer | 30/290 |

Primary Examiner—Douglas D. Watts
Assistant Examiner—Paul M. Heyrana
Attorney, Agent, or Firm—John A. Beehner

[57] ABSTRACT

A drywall cutting device adapted for use with a piece of conventional drywall. The device includes a slidetrack which can be mounted on an edge of a piece of drywall and guide rails which extend substantially perpendicularly from the slidetrack, such that when the slidetrack is placed on an edge of a piece of drywall, the guide rails extend out over the piece of drywall. Slidably mounted on the guide rails is a cutting means holding device, which holds a cutting means such as a knife blade or razor.

The drywall cutting device cuts drywall as follows; the slidetrack is placed on an edge of a piece of drywall, the device is slid to the desired cut point, the cutting means is aligned in the desired cut direction, and the cutting means holding device is slide into position on the guide rails. The desired cut is then made by sliding the drywall cutting device along the edge. Use of the present invention will thus result in savings of time and cost to the user.

19 Claims, 7 Drawing Sheets

DRYWALL CUTTING DEVICE

BACKGROUND OF THE INVENTION

1) Technical Field

This invention relates to drywall cutting devices and, more particularly, to drywall cutting device which can quickly and easily cut both horizontally and vertically, can efficiently cut right angles, and can cut drywall in measured lengths without the need for separate measuring, marking, and cutting steps.

2) Description of the Prior Art

Look in almost any building today, and in one place or another drywall can be found. Drywall is basically a compressed core of gypsum with heavy paper glued to both sides. It is used for everything from walls to ceilings. Drywall is usually formed in 4'×8' sheets, with thicknesses between ¼" to ⅝". Drywall can also come in 10' or even 12' lengths. The problem with these sizes is that drywall often needs to be cut to fit certain areas. Before the present invention, four separate tools used in stages must be used to achieve a straight cut of drywall; a measuring tape, a pencil, a chalk-line, and a utility knife. The steps undertaken would be as follows: first, measure the desired length with the measuring tape and mark the drywall with the pencil at the top and bottom edges, second, stretch the chalk line between the marks and snap a line to guide the cut, and third, cut the drywall along the line with the utility knife. This tedious process results in inefficient use of time and thus is wasteful. Accordingly, an object of the present invention is to provide a device which easily and quickly cuts drywall.

Another problem of the prior art is that right angle cuts are difficult for lay persons to do on drywall, and even present problems for professionals. A perfect right angle enhances the look of the drywall project, and also results in less wasted drywall, thus saving money for the consumer. Therefore, an object of the present invention is to provide an easy and simple device for cutting right angles in drywall.

Another object of the present invention is to provide a device that ensures accurate cutting of drywall.

Yet another object of the present invention is to provide a drywall cutting device which minimizes markings and scorings needed for cutting drywall, thereby lessening cleanup of the drywall.

Still another object is to provide a drywall cutting device which is usable with standard drywall sheets of varying thicknesses. Finally, it is object of the present invention to provide a drywall cutting device which is of simple and inexpensive construction.

SUMMARY OF THE INVENTION

The present invention provides a method for cutting drywall and a device for implementation of that method to speed and ease the tedious task of drywall cutting.

The device consists of a slidetrack, which is similar in shape to a piece of angle iron, which can be placed on an edge of a piece of drywall. To the slidetrack are attached guide rails which extend substantially perpendicularly from the slidetrack, and when the slidetrack is placed on an edge of a piece of drywall, the guide rails extend out over the piece of drywall. Slidably mounted on the guide rails is a cutting means holding device, which holds a cutting means such as a knife blade or razor.

To cut a piece of drywall, the device is placed on a piece of drywall such that the slidetrack is mounted on an edge of the piece of drywall. The device is then slid to the starting end of the drywall and the cutting means holding device is slid along the guide rails to the desired cutting starting position. The cutting means is then aligned in the desired cut direction, and the desired cut is made. The procedure is repeated until all desired cuts are made.

As can readily be seen from the above description, this method of cutting drywall is efficient, simple, and quick. The device also described above provides the most effective means for accomplishing the objects of the method described, and can be utilized in many different ways.

DESCRIPTION OF THE PREFERRED EMBODIMENT

For purposes of this description, inner shall mean adjacent the intended location of a piece of drywall to be cut, and outer shall mean opposite the drywall. Also, unless otherwise stated, the components of the drywall cutting device are preferably to be constructed of a lightweight metal such as aluminum, formed in the required shapes.

The drywall cutting device 10 is shown in its preferred embodiment in FIGS. 1-4 as having a slidetrack 12 which is preferably of L-shaped cross-section so that it will fit easily on an edge of a piece of drywall 14. Whereas in the preferred embodiment, the horizontal leg 16 of the slidetrack 12 slidably engages the edge of a piece of drywall, rollers could be added to assist in the motion of the slidetrack along the edge of the piece of drywall 14.

Figures 2, 3:
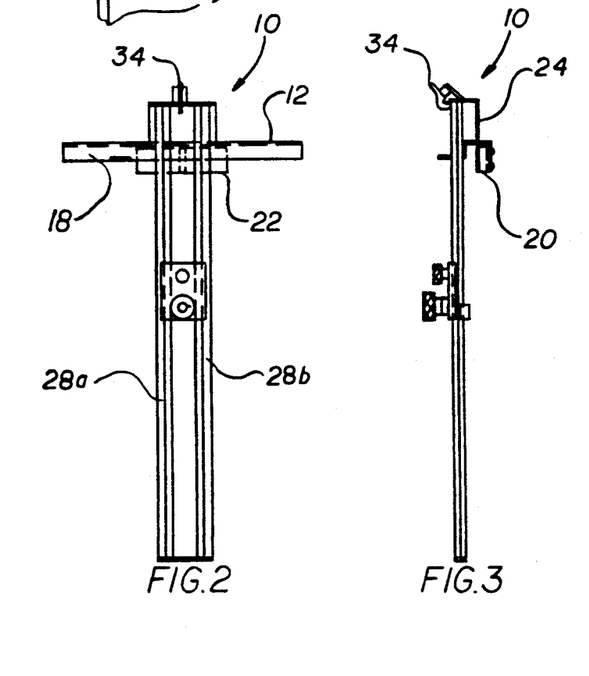
FIG. 2 is a front elevational view of the present invention showing the cutting means holding device on the guide rails.
FIG. 3 is a side elevational view of the present invention showing the cross-sectional L-shape of the slidetrack, the latch mechanism for holding the guide rail extensions in place, and how the guide rails are mounted to the slidetrack.
Figure 4:
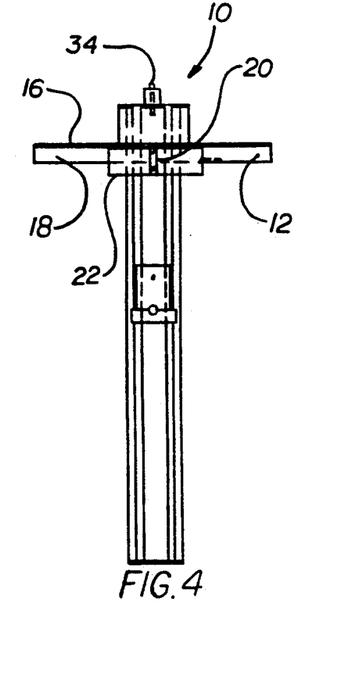
FIG. 4 is a rear elevational view of the drywall cutting device showing the rear mount of the cutting means holding device.
Figures 16, 17:
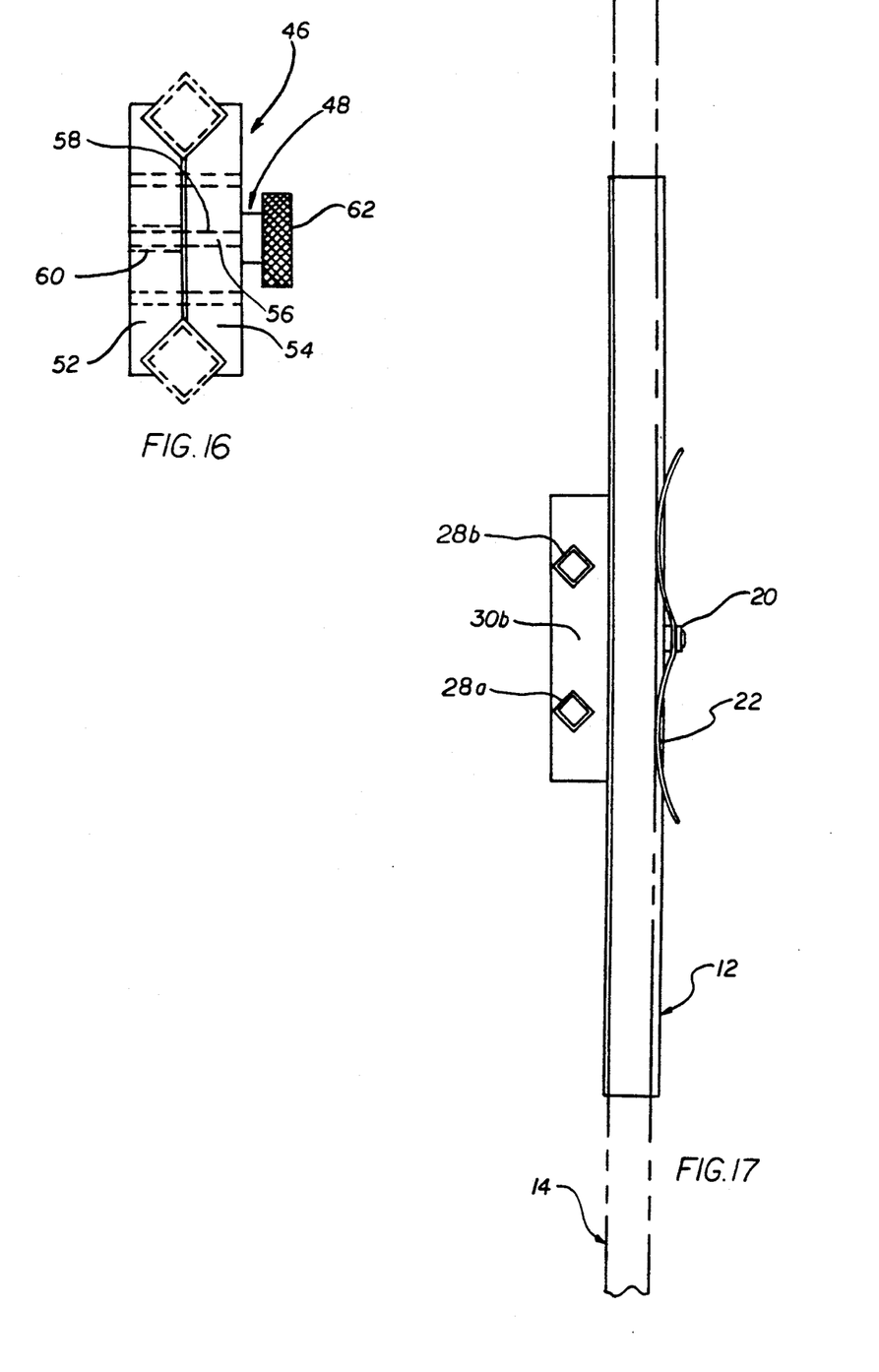
FIG. 16 is a partial detail top plan view of the present invention showing the plates of the cutting means holding device in place on the guide rails and the securement means on that device.
FIG. 17 is a bottom view of the drywall cutting device showing the spring tensioning device which helps to hold the drywall cutting device to the drywall to be cut.

As seen in FIGS. 3, 4, and 17, mounted to the horizontal leg 16 of the slide track 12 opposite the vertical leg 18 of the slidetrack 12 is a spring support 20 extending perpendicularly downwards from the horizontal leg 16. Mounted to the spring support 20 and substantially parallel to the vertical leg 18 of the slidetrack 12 is a butterfly spring 22 which is spaced apart from the vertical leg 18 such that most varieties of drywall, which varies in thickness, can be accommodated between them, yet the butterfly spring 22 will act to secure the slidetrack 12 against the piece of drywall regardless of thickness.

Figure 1:
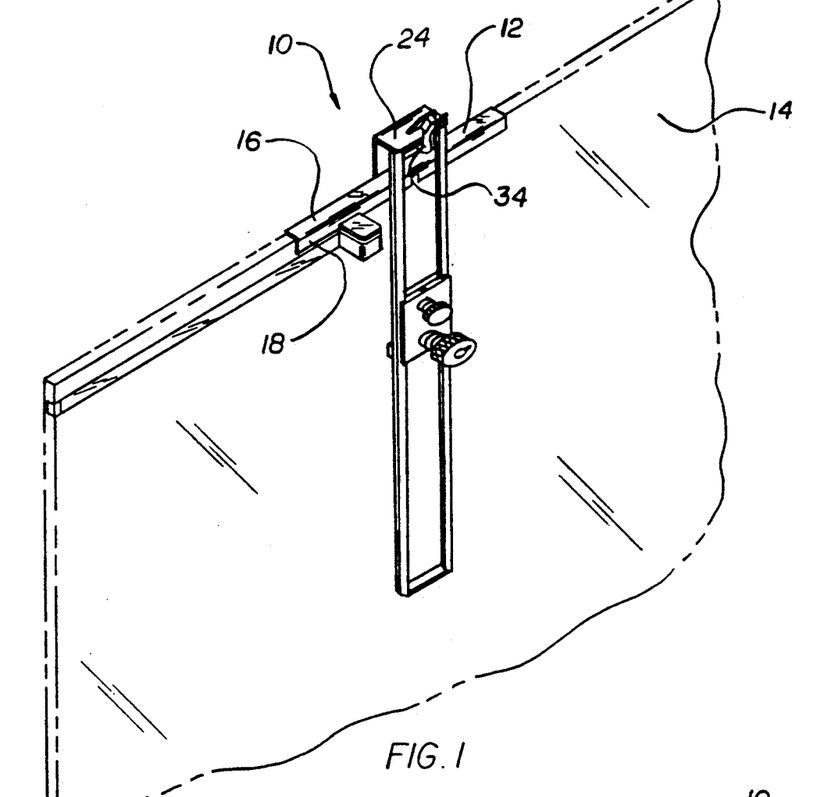
FIG. 1 is a perspective view of the drywall cutting device as it appears in use on a piece of drywall, showing the measuring tape holder version of the invention.

Extending upwards from the spring support side of the horizontal leg 16 of the slidetrack 12 in the preferred embodiment is an L-shaped guide rail bracket 24, best seen in FIG. 1. The long leg of the bracket 24 is connected to the horizontal leg 16 of the slidetrack 12 such that the short leg of the bracket 24 extends out over and past the vertical leg 18 of the slidetrack 12 and substantially parallel with the horizontal leg 16 of the slidetrack 12.

Figure 5:
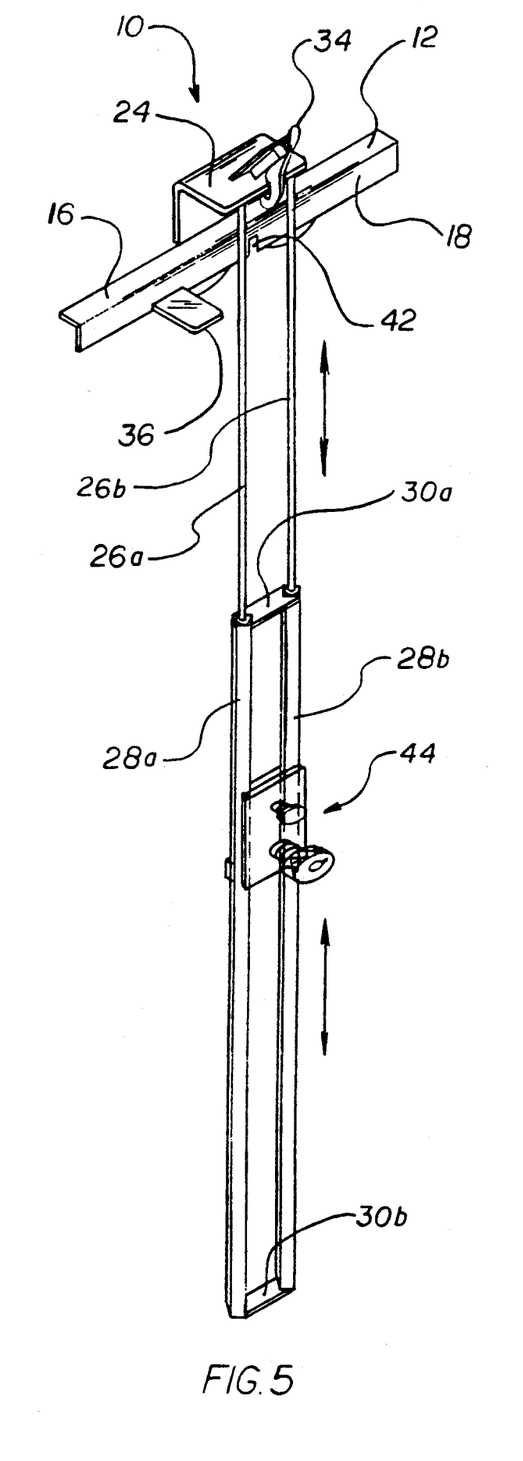
FIG. 5 is a perspective view of the present invention showing the guide rail extensions in operation.
Figures 11, 12:
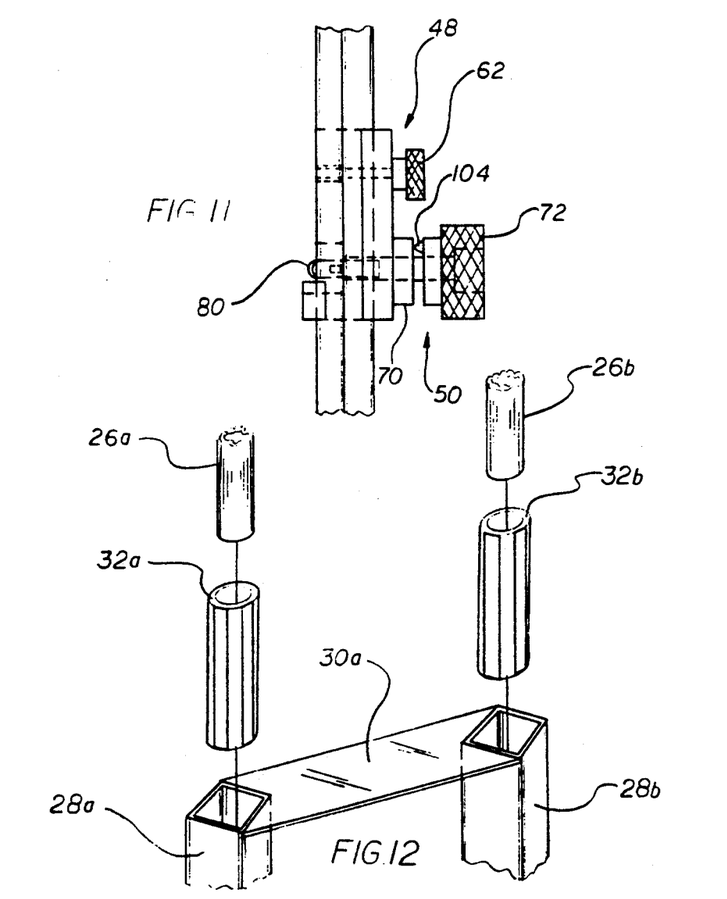
FIG. 11 is a partial detail side elevational view of the present invention showing how a blade held by the cutting means holding device is rotated for different cutting directions.
FIG. 12 is a partial detail perspective view showing the guide rail extensions fitting within the guide rails.

Connected to the underside of the short leg of the bracket 24, in the preferred embodiment, are a pair of generally parallel guide rail extensions 26a and 26b, which extend downwards. These guide rail extensions 26a and 26b, shown in FIGS. 5 and 12, are preferably tubular rails which fit inside of the guide rails 28a and 28b, which are rectangularly shaped in cross-section, hollow, generally parallel and slidably mounted on the guide rail extensions 26a and 26b. At the upper and lower ends of the guide rails are spacer struts 30a and 30b, which hold the guide rails 28a and 28b in the desired spaced apart relation. Shown in FIG. 12 are the tubular spacers 32a and 32b, which fill the space gap between the outer surface of the guide rail extensions 26a and 26b and the interior surface of the guide rails 28a and 28b, thus allowing better sliding and more accurate cutting.

Shown in FIGS. 1-5 is a guide rail release latch 34 mounted to the top of the short leg of the guide rail bracket 24 directly above the connection point of the guide rail extensions 26a and 26b. The latch is designed to prevent the guide rails 28a and 28b from sliding down the guide rail extensions 26a and 26b by engaging and securing the top guide rail spacer strut 30a against the underside of the short leg of the guide rail bracket 24.

Figure 6:
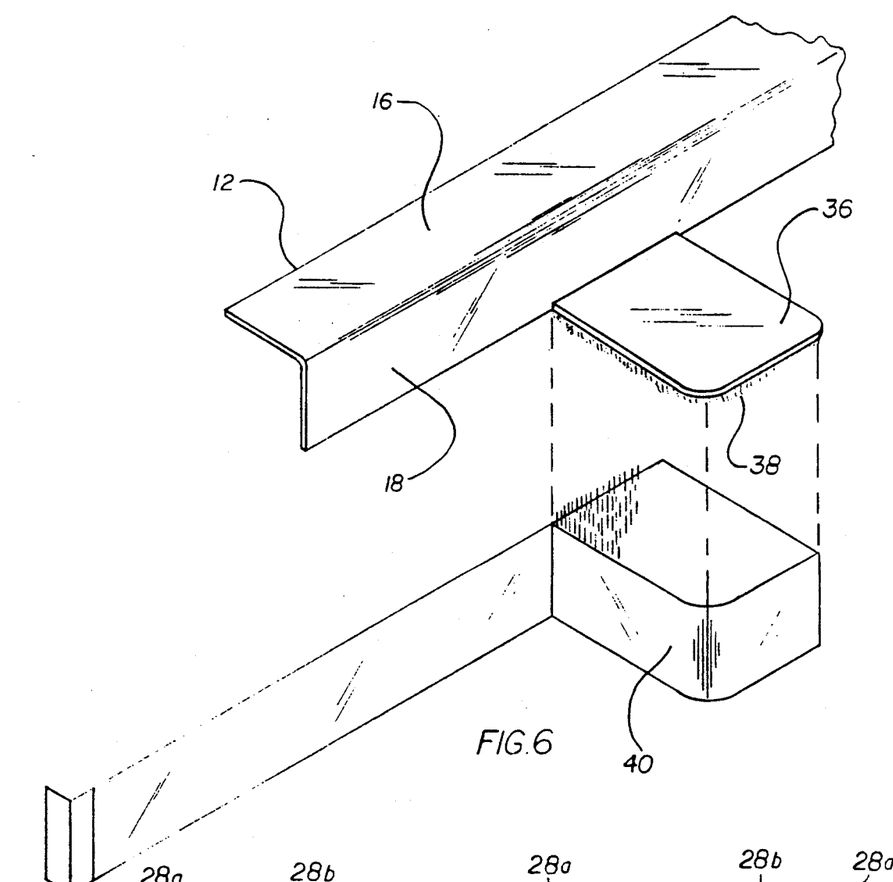
FIG. 6 is a partial detail perspective view of the present invention showing the slidetrack and mounted thereon is a measuring tape holder, which has hook and loop type fasteners on one face to hold a similarly equipped measuring tape.

In the preferred embodiment, a tape measure holding device 36 would preferably be constructed of a flat piece of metal and mounted on and perpendicular to the vertical leg 18 of the slidetrack 12 as shown in FIGS. 5 and 6. One face of the device 36 would have a fastener 38, such as a hook and loop type, shown in FIG. 6, to which could be attached a similarly equipped tape measure 40. Measurements could be taken either by passing the measuring tape over the center cut line 42 of the device 10, which could yield direct readings, or by directing the tape in the manner shown in FIG. 1, and adding a constant to make up the difference from the end of the tape to the center cut line 42.

Figure 7:
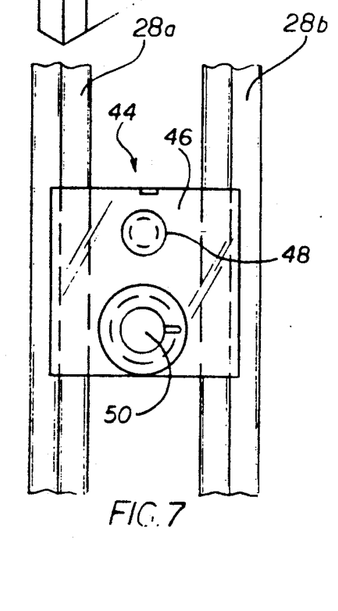
FIG. 7 is a partial detail front elevational view showing the guide rails and the cutting means holding device.
Figure 8:
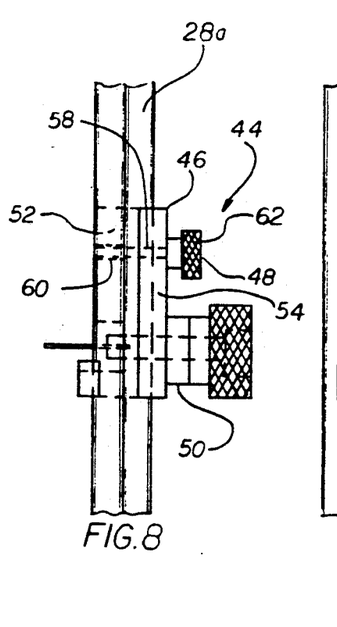
FIG. 8 is a partial detail side elevational view of the drywall cutting device showing the cutting means holding device with a cutting means emplaced therein.
Figure 9:
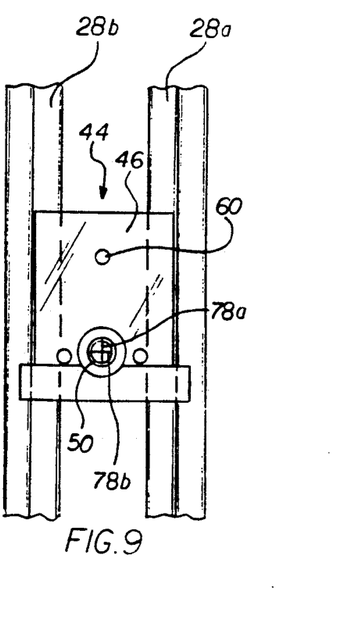
FIG. 9 is a partial detail rear elevational view of the present invention showing the cross-shaped slotted end of the holding member of the cutting means holding device.

Shown in FIGS. 7, 8 and 9 is the cutting means holding device 44 having three major components; a trolley 46, a trolley securing device 48, and a cutting means holder 50.

The trolley 46 is preferably constructed of two rectangular metal plates 52 and 54 extending between and extending slightly past the guide rails 28a and 28b on either side, thereby "sandwiching" the guide rails 28a and 28b between the plates so that the trolley 46 may slide up and down the guide rails 28a and 28b. The plates 52 and 54 would preferably be held in the proper position by both the trolley securing device 48 and the cutting means holder 50. In the preferred embodiment, the plates 52 and 54 are shaped to conform to the outer surfaces of the guide rails 28a and 28b, which allows for better sliding and lessens unwanted sideways motion of the trolley 46.

The trolley securing device 48, as best seen in FIG. 16, is preferably constructed of a bolt 56 which passes through a hole 58 through the upper section of the outer plate 54 and is screwed into a threaded hole 60 in the upper section of the inner plate 52. The bolt 56 would preferably have a handle end 62 which would be knurled around the edges to facilitate gripping. The handle end 62 of the bolt 56 would be wider in diameter than the diameter of the hole 58 in the outer plate 54. By rotating the bolt 56 in a clockwise direction, the bolt 56 pulls the inner and outer plates 52 and 54 together as it draws down into the threaded hole 60, thereby frictionally securing the trolley 46 in one place on the guide rails 28a and 28b. To allow movement of the trolley 46, the bolt 56 is rotated counter-clockwise, thus separating the plates 52 and 54 slightly to allow sliding motion of the trolley 46 on the guide rails 28a and 28b.

Figures 18, 19, 20, 21, 22, 23:
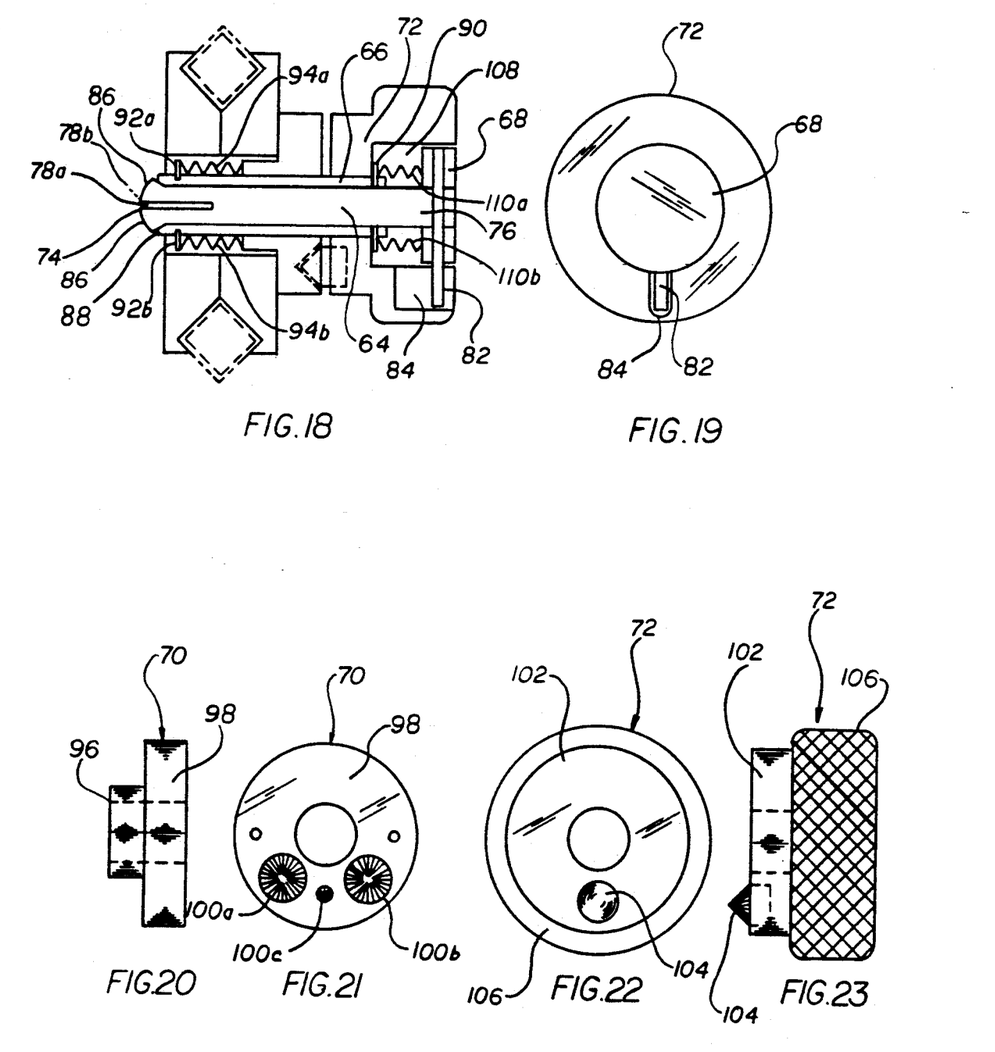
FIG. 18 is a partial detail cutaway top plan view of the present invention showing the interior workings of the cutting means holding device, including the blade insertion button and the blade rotation device.
FIG. 19 is a partial detail front elevational view of the present invention showing the blade insertion button and the blade rotation device.
FIGS. 20 and 21 are partial detail side and front elevational views, respectively, of the drywall cutting device showing the blade location securing device.
FIGS. 22 and 23 are partial detail front and side elevational views, respectively, of the present invention showing the blade rotation device.

The cutting means holder 50 is shown in the preferred embodiment in FIGS. 10, 11, and 18-23. The holder 50 is located in the lower section of the trolley 46 directly below the trolley securing device 48 and in line with the center cut line 42 in a cylindrical hole formed through the two plates 52 and 54. FIG. 18 shows a top view of the preferred embodiment of the cutting means holder 50, showing five major elements; a slidable holding member 64, a sleeve 66, a button 68, a blade location securing device 70, and a blade rotation device 72.

In the preferred embodiment, the slidable holding member 64 has two ends, a slotted end 74 and a button end 76. The slotted end 74 has two perpendicular slots 78a and 78b, shown clearly in FIG. 9, which are approximately ¼ of the length of the holding member 64 and slightly wider that the thickness of the non-cutting end of a knife blade 80 so that the non-cutting end of a knife blade 80 may be placed within One of the slots 78a and 78b. Also mounted on the slotted end 74 of the holding member 64 are small triangular-shaped extensions 86 on the outer surface of the slotted end 74.

The button 68 is mounted on the button end 76 of the holding member 64, and perpendicular to the longitudinal axis of the holding member 64. Extending radially outwards from the edge of the button 68 is a corotation pin 82 which makes the button 68 and holding member 64 rotate as the blade rotation device 72 is rotated, as the pin 82 extends into the body of the blade rotation device 72 in a channel 84 cut therein.

In the preferred embodiment, encasing the holding member 64 is a sleeve 66 whose inner diameter is slightly greater than the outer diameter of the member 64 so that the member 64 may slide within the sleeve 66. The sleeve 66 has two ends, an inner end 88 near the slotted end 74 of the holding member 64, and an outer end 90 which is preferably extended into blade rotation device 72. The sleeve 66 is mounted in the blade rotation device 72 with the outer end 90 extending into the device 72 such that when the device 72 is rotated, the sleeve 66 remains stationary, but when the blade rotation device 72 is pulled back, the sleeve 66 is pulled with it. Extending outward from the outer surface of the sleeve 66, near the inner end 88, and perpendicular to the longitudinal axis of the sleeve 66 are a pair of sleeve pins 92a and 92b, to which are attached a pair of pin springs 94a and 94b, described later. The sleeve 66 and holding member 64 are extended within the holes through the trolley 46, the blade location securing device 70, and the blade rotation device 72.

The blade location securing device 70 is preferably constructed of two concentric disks placed face to face, a first disk 96 of approximately ½ the diameter of a second disk 98 each having a center hole drilled through of diameter slightly greater than the outer diameter of the sleeve 66, so that the sleeve 66 may slide through the holes. The first disk 96 is of slightly smaller diameter than the hole through the two plates 52 and 54, so that the disk 96 fits within the hole. The second disk 98 is mounted to the outer plate 54 such that the first disk 96 is within the hole. The second disk 98 is of a diameter approximately ⅔ the width of the outer plate 54. On the outer face of the second disk 98 there are preferably 3 conical indentations 100a–c drilled into the disk, two 100a and 100b of larger and deeper size than the third 100c, the first two 100a and 100b spaced apart at a 90° angle, the third 100c at a point halfway between the larger two 100a and 100b. All three indentations 100a–c have their center points on the same circle, one concentric with the outer edge of the second disk 98 and halfway between the outer edge and the inner edge of the second disk 98.

Aligned with and along the longitudinal center line of the blade location securing device 70 is the blade rotation device 72, which is constructed of two concentric disks connected face-to-face having center holes. The first rotation disk 102 is preferably of the same diameter as the second disk 98 of the blade location securing device 70. The hole in the first rotation disk 102 is of the same diameter as the one in the second disk 98 also. Extending outwardly from the inner face of the first rotation disk 102 is a conical extension 104 preferably of the same size and on the same arc as the larger conical indentations 100a and 100b in the second disk 98 of the blade location securing device 70, such that the conical extension 104 will fit within and substantially fill the two large conical indentations 100a and 100b. However, only the tip of the conical extension 104 will fit within the smaller third conical indentation 100c thus spacing apart the blade location securing device 70 and the blade rotation device 72.

The second rotation disk 106 has a larger diameter than the first rotation disk 102 and also has a much larger center hole 108. This center hole 108 is of slightly greater diameter than the diameter of the button 68. Also cut into the second rotation disk 106 is the channel 82 referred to above, which extends from the outer face of the second rotation disk 106 towards the inner face of that disk, and along a radius of the second rotation disk 106, such that the corotation pin 82 will fit within the channel 84.

Furthermore, in the preferred embodiment, the outer edge of the second rotation disk 106 would be knurled, in order to facilitate gripping and turning of the blade rotation device 72.

Figure 10:
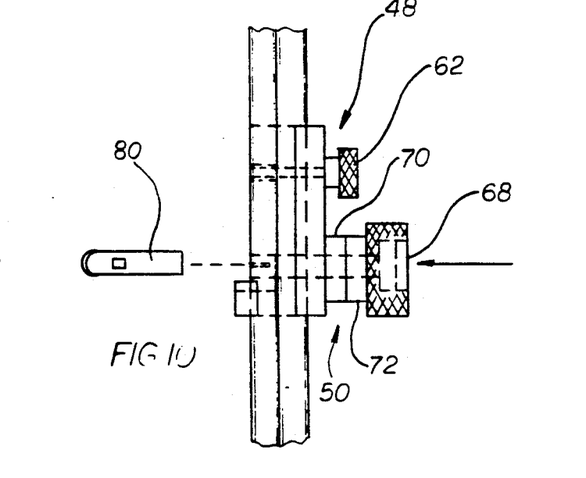
FIG. 10 is a partial detail side elevational view of the drywall cutting device showing insertion of a cutting blade by depression of the blade insertion button.

Extending between and connected to the outer face of the first rotation disk 102 and the inner surface of the button 68 are a pair of springs 110a and 110b, shown in FIG. 18, Which tension the button 68 and the connected holding member 64 away from the first rotation disk 102, thereby pulling the holding member 64 against the inner end of the sleeve 66, thus engaging the small triangular extensions 86 and narrowing the perpendicular slots 78a and 78b, and thus frictionally securing a knife blade 80 within the slot 78a and 78b. By pressing the button 68 into the center hole 108 of the second rotation disk 106, as shown in FIG. 10, the holding member 64 slides through the sleeve 66, the triangular extensions 86 disengage the sleeve 66, and the slots 78a and 78b widen, thus allowing easy removal of an old knife blade or insertion of a new one.

Extending between and connected to the sleeve pins 92a and 92b and the inner face of the first disk 96 of the blade location securing device 70 are a pair of pin springs 94a and 94b which tension the sleeve 66 away from the inner face of the first disk 96. The blade rotation device 72 is thus pulled against the blade location securing device 70, preferably securing the conical extension 104 within one of the conical indentations 100a, thereby preventing rotation of the blade rotation device 72 and thus rotation of the knife blade 80.

To rotate a knife blade 80, the blade rotation device 72 is pulled and held away from the blade location securing device 70, as shown in FIG. 11, removing the conical extension 104 from the conical indentation 100a in which it was emplaced, the blade rotation device 72 is rotated about the longitudinal axis of the holding member 64 thus turning the knife blade 80 as the holding member 64 connected to the button 68 is rotated also. The blade rotation device 72 is then released, allowing the pin springs 94a and 94b to pull the device 72 to adjoin the blade location securing device 70, allowing the conical extension 104 to fit within and engage another conical indentation 100b. To secure the knife blade 80 in non-cutting position, the conical extension 104 would be placed in the third conical indentation 100c into which only the tip of the conical extension 104 will fit and thus the blade rotation device 72 would be held away from the blade location securing device 70, thus holding the sleeve 66 and the holding member 64 back away from the drywall to be cut, thus holding the knife blade 80 back away also.

Figure 13:
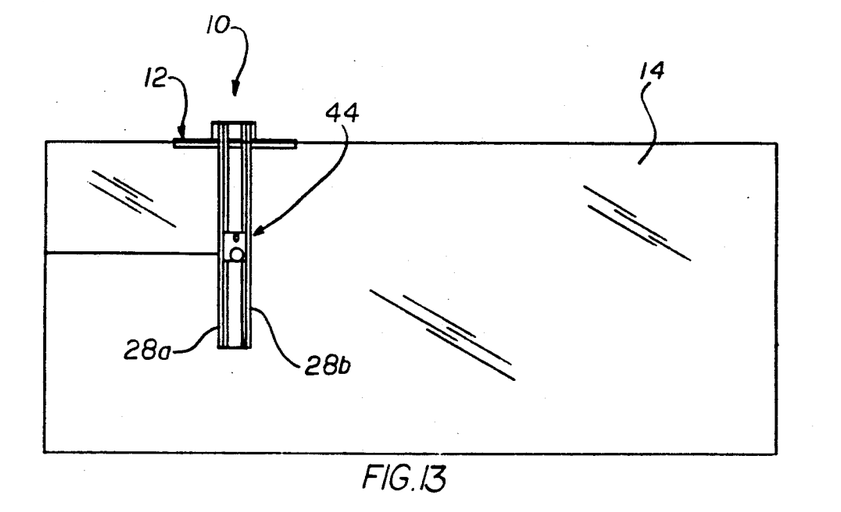
FIG. 13, 14, and 15 show the method of cutting drywall using the present invention.
Figure 14:
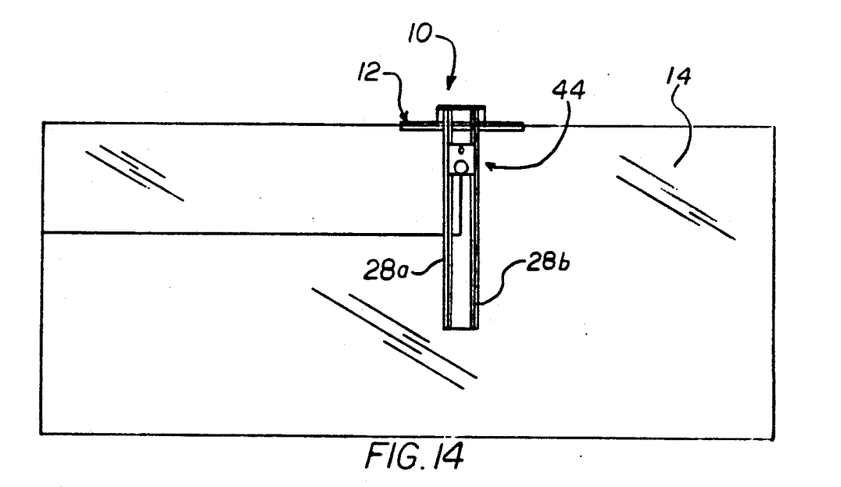
Figure 15:
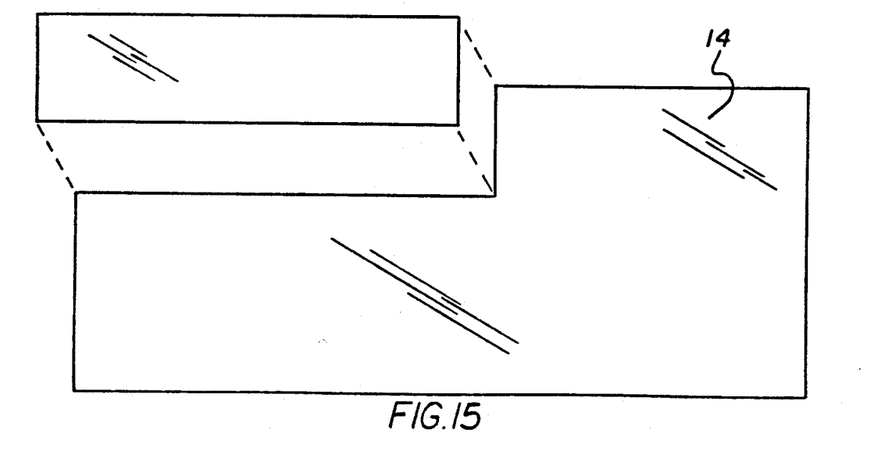

In cutting a piece of drywall 14, as shown in FIGS. 13-15, the slidetrack 12 of the drywall cutting device 10 is placed on an edge of the piece of drywall 14, at the adjacent side where the cut is to begin. The knife blade 80 is rotated to the desired cut direction by the process described above, the trolley securing device 48 is tightened, thus securing the trolley at the desired cut level, then the cut is begun. The drywall cutting device 10 is slid along the edge of the piece of drywall 14, cutting the drywall along a line parallel to the edge being slid upon. As shown in FIG. 14, to Cut perpendicularly to the first cut made the knife blade 80 is rotated 90°, the trolley securing device 48 is loosened, and the trolley 46 is slide along the guide rails 28a and b for the desired cut length. As drywall often comes in 4' wide sheets, to cut across the entire piece of drywall 14, the guide rail release latch 34 is opened and the guide rails 28a and 28b can extend across the drywall along the guide rail extensions 26a and 26b. After cutting, the cut piece of drywall can then be removed from the original piece of drywall 14.

As can be seen from the above description, this method and device for cutting drywall is a great improvement over prior methods and devices for achieving the same results. No separate tools, other than a utility knife for finishing the sectioning of the cut drywall, are needed to achieve the cutting of the drywall, thus resulting in saving of time and cost to the user of the present invention.

It is to be understood that the above description is not intended in any way to limit the scope of the present invention, and that the scope of the invention shall follow from the claims set forth below.

There has thus been set forth and described an invention which accomplishes at least all of the stated objectives.

I claim:

1. A drywall cutting device comprising:
   a slidetrack wherein said slidetrack further comprises a track member having a L-shaped cross section connected to a member extending substantially perpendicularly downward from one arm of said track member whereby a channel is formed, said channel of substantial width to accommodate various thicknesses of drywall, whereby said cutting device may be slidably mounted on an edge of a piece of drywall;
   guide means connected to said slidetrack and extending substantially perpendicularly therefrom, whereby said guide means may allow motion of a device slidably mounted thereon on a line substantially perpendicular to the plane of motion of said slidetrack;
   means for cutting said drywall; and
   a cutting means holding device slidably mounted on said guide means whereby drywall may be cut in various directions by sliding said cutting means holding device on said guide means or by sliding said slidetrack on said edge of said piece of drywall.

2. The drywall cutting device of claim 1 wherein said slidetrack further comprises a spring tensioner mounted in said channel whereby said channel may be held more closely against said drywall, thereby facilitating cutting of drywall by assisting in the positioning of said drywall cutting device.

3. The drywall cutting device of claim 1 wherein said guide means further comprises two substantially parallel tubular members mounted on said slidetrack and substantially perpendicular thereto.

4. The drywall cutting device of claim 3 wherein said tubular members are substantially rectangular in cross section, and said mounting further comprises an L-shaped bracket connected to and extending upwardly from said slidetrack such that an arm of said bracket extends over and in front of said slidetrack, and to the outer underside of said arm are connected and extended downward said tubular members.

5. The drywall cutting device of claim 4 wherein said guide means further comprise extending tubular guide rails comprising two exterior tubular members and two interior tubular members wherein said interior tubular members are connected to and extend downwards from said L-shaped bracket and said exterior tubular members allow said interior tubular members to slide into the hollow center area of said exterior tubular members, said exterior tubular members being connected by struts extending between and connected to the respective upper and lower sections of said exterior tubular members, whereby the exterior tubular member assembly may be slid along said interior tubular members, thereby increasing the overall length extension of said guide means.

6. The drywall cutting device of claim 5 further comprising a latch means for restricting slidability of said exterior tubular member assembly.

7. The drywall cutting device of claim 1 wherein said cutting means holding device further comprises a trolley slidably mounted on said guide means.

8. The drywall cutting device of claim 7 wherein said trolley further comprises spaced apart, generally parallel, and substantially rectangular first and second plates, the first substantially rectangular plate on one side of said guide means, the second substantially rectangular plate on the opposite side, whereby said guide means is sandwiched between said plates, thereby allowing said trolley to slide upon said guide means without falling therefrom, said trolley further comprising a generally cylindrical hole extending through said plates, said hole substantially perpendicular to the plane in which said trolley slides.

9. The drywall cutting device of claim 8 wherein said trolley further comprises means for narrowing the gap between said plates, thereby restricting movement of said trolley along said guide rails.

10. The drywall cutting device of claim 9 wherein said trolley further comprises a cutting device holder rotatably and movably mounted on said trolley, and on the side of said trolley facing said slidetrack, thereby allowing engagement of said piece of drywall.

11. The drywall cutting device of claim 10 wherein said cutting device holder further comprises a sleeve and rotatable holding member, said member slidably mounted inside said sleeve, and both mounted within said cylindrical hole through said plates, said member further adapted to receive and hold a conventional breakaway knife blade, whereby said blade would be held in contact with and cutting into said piece of drywall.

12. The drywall cutting device of claim 11 wherein said sleeve is rotatable in 90° increments, whereby said blade may be held to cut parallel to either said guide means or to said slidetrack, thereby cutting in any of four directions.

13. The drywall cutting device of claim 10 wherein said cutting means holder further comprises a spring-loaded push button device adapted for receiving and holding a cutting means such as a knife blade, whereby, when a button is pushed and held, the receiving and holding means allows for insertion of the non-cutting end of said blade, then when said button is released, holds said blade is held within said receiving and holding means, the process thereby facilitating changing of knife blades.

14. The drywall cutting device of claim 13 wherein said receiving and holding means further comprises, said slidable holding member having a slotted end to be adjacent said drywall, and a button end opposite said slotted end, said slotted end comprising, two slots cut into said holding member, each along the longitudinal center line of said holding member and substantially perpendicular to each other, starting at said slotted end of said holding member and extending back into said holding member approximately ¼ of the length of said holding member, whereby a cross-shaped divisioning of said slotted end of said holding member is achieved, said slotted end of said holding member further comprising small triangular-shaped extensions mounted on the outer edges of said slotted end of said holding member, said sleeve further comprising, said holding member slidably mounted inside of said sleeve, inner diameter of said sleeve slightly wider that the cross-sectional diameter of said holding member, whereby said extensions on said slotted end of said holding member extend wider than said inner diameter of said sleeve, thereby, when said member is retracted into said sleeve, said holding member is stopped from retracting further by said extensions contacting said sleeve, contact between said sleeve and said extensions further acting to compress said slotted end of said holding member, whereby said slots are narrowed, thereby frictionally securing said cutting means therein, said sleeve further comprising a pair of pins mounted on the outer surface of said sleeve, perpendicular to the longitudinal axis of said sleeve, and near said slotted end of said holding member, and pin springs connected to and extending between said pins and a blade location securing device, whereby said sleeve and said member are tensioned away from said blade location securing device, said sleeve, said holding member, said pins, and said pin springs all emplaced inside of and through said generally cylindrical hole in said trolley, said button further comprising, a disk mounted on the button end of said holding member slots and substantially perpendicular to the longitudinal axis of said holding member, a corotation pin extending outward from an edge of said disk along a radius of said disk, one or more springs connected to and extending between said disk and said blade rotation device whereby said disk is tensioned in a direction opposite said slotted end of said holding member, thereby pulling said holding member back through said sleeve, narrowing said slots and frictionally securing said cutting means emplaced therein.

15. The drywall cutting device of claim 14 wherein said blade location securing device further comprises, two concentric disks connected in face-to-face relation and having center holes of diameter slightly greater than the outer diameter of said sleeve whereby said sleeve may fit therethrough, a first disk of smaller diameter than a second disk, said first disk of outer diameter slightly less than the inner diameter of said hole in said trolley, whereby said first disk fits within said hole, said second disk mounted on said trolley such that said first disk is within said hole, said second disk further comprising a plurality of conical indentations formed in the disk face opposite said first disk, whereby a conical extension on said blade rotating device may be movably held therein, thereby allowing for blade location securement.

16. The drywall cutting device of claim 15 wherein said blade rotation device further comprises, two concentric disks connected in face-to-face relation, a first rotation disk having a center hole of diameter slightly greater than the outer diameter of said sleeve whereby said sleeve may fit therethrough, a second rotation disk having a center hole of diameter slightly greater than the diameter of said button, whereby said button may be placed therein and depressed a distance equal to the thickness of said second rotation disk, said first rotation disk further comprising said conical extension extending outwardly from the disk face opposite said second rotation disk, said conical extension of approximately the same dimensions as said conical indentations on said second disk of said blade location securing device, said second rotation disk further comprising a radial slot extending outwardly from said center hole whereby said pin on said button may fit within said slot, thereby when said blade rotation device is rotated, said button is likewise rotated, and thus said holding member and said cutting device are also rotated, said blade rotation device and said blade location securing device are aligned such that said sleeve extending from said blade rotation device extends through said center hole in said blade location securing device and said blade rotation device is retractably and rotatably held against said blade location securing device by tensioning from said pin springs acting on said sleeve, thereby securing said conical extension on said blade rotation device within a conical indentation on said blade location securing device.

17. The drywall cutting device of claim 16 wherein said blade rotation device further comprises knurling on the outer edge of said second rotation disk whereby a better grip may be had on said blade rotation device for its rotation.

18. The drywall cutting device of claim 1 wherein said slide track further comprises means for mounting a conventional measuring device thereon, whereby more exact cutting dimensions may be followed.

19. A method for cutting drywall comprising, providing a slidetrack, guide means connected to said slidetrack and extending substantially perpendicularly therefrom, cutting means, a cutting means holding device slidably mounted on said guide means, and a piece of drywall;
mounting said slidetrack on an edge of said piece of drywall;
sliding said cutting means holding device on said guide rails to the desired cutting starting point;
aligning said cutting means with the desired direction of cutting; and cutting said drywall with said cutting means by sliding said slidetrack along said edge of said piece of drywall, whereby said cutting means divisions said drywall along the cut line.

* * * * *